T. A. HOOVER.
TIRE CARRIER.
APPLICATION FILED OCT. 30, 1918. RENEWED FEB. 24, 1920.
1,337,911.
Patented Apr. 20, 1920.
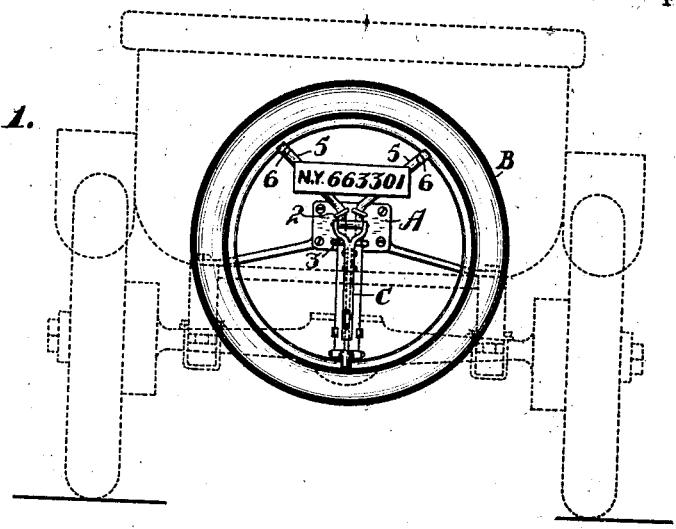
Fig.1.
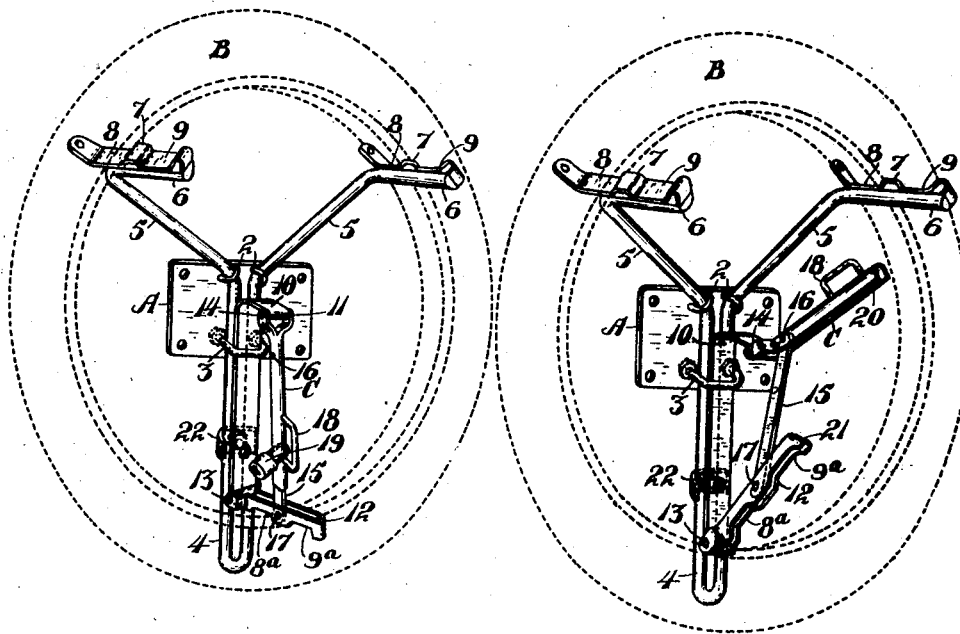
Fig.2.
Fig.3.
INVENTOR
Thomas A. Hoover
BY
Strong & Townsend
ATTORNEYS

UNITED STATES PATENT OFFICE.

THOMAS A. HOOVER, OF FRESNO, CALIFORNIA.

TIRE-CARRIER.

1,337,911.

Specification of Letters Patent.  Patented Apr. 20, 1920.

Application filed October 30, 1918, Serial No. 260,233. Renewed February 24, 1920. Serial No. 360,761.

*To all whom it may concern:*

Be it known that I, THOMAS A. HOOVER, a citizen of the United States, residing at Fresno, in the county of Fresno and State of California, have invented new and useful Improvements in Tire-Carriers, of which the following is a specification.

This invention relates to a device for carrying spare or extra tires on automobiles, and one of the objects of the invention is to provide a simple, substantial, easily operated carrier which may be securely attached to the back or other portion of an automobile and rigidly support one or more tires, as the owner may desire.

Another object of the invention is to provide a tire carrier that may be readily adjusted to receive any size tire; and, furthermore, to provide a spring-supported clamping member which may be instantly released if it is desired to remove a tire, and which will positively prevent rattle when the tires are locked. Other objects will hereinafter appear.

The invention consists of the construction, combination and arrangement of parts as hereinafter more fully described and claimed, having reference to the accompanying drawings in which—

Figure 1 is a rear view of an automobile showing the position of the tire carrier.

Fig. 2 is a perspective view of the tire carrier showing the locking lever in locked position.

Fig. 3 is a similar view showing the locking lever released and the tire in position before removal.

Referring to the drawings in detail, A indicates a base plate which is adapted to be secured to the rear end of an automobile. Secured to the base plate by means of U bolts 2 and 3 is a Y-shaped frame consisting of a pair of parallel leg members 4 and a pair of arms 5. The upper ends of the arms 5 are turned at right angles and extended, as shown at 6, to provide a pair of supporting arms for the tire, generally indicated at B, each extension 6 having secured on the upper side a plate 7 which is recessed, as at 8 and 9, to receive one or more tires and secure the same against endwise movement thereon.

Adjustably secured to the base plate A and the leg portion of the Y frame is a spring arm 10, the upper end of which is turned, as at 11, to form a support for a locking arm, generally indicated at C. This arm forms a toggle connection between the upper end of the spring 11 and a lock and clamping lever, generally indicated at 12. This lever is pivotally secured to the lower end of the spring arm 10, as at 13, and the lower face of the lever is recessed, as at 8$^a$ and 9$^a$, to engage the tire rims, as shown. The locking arm consists of the arm C pivotally attached to the upper end of the spring arm, as at 14. It furthermore consists of a link 15, which is pivotally attached to the arm C at the upper end, as at 16, and at its lower end, as at 17, to the locking lever 12, the locking arm being provided with a handle 18 to permit it to be readily manipulated and also to permit the application of an ordinary pad lock, as shown at 19. This pad lock serves the function of locking the arm and link 15 against independent movement with relation to each other, thereby preventing release of the clamping lever 12 when the tires have been placed in position on the carrier.

In actual operation, if it is desired to place a tire on the carrier, it is only necessary to swing the arm C up into the position shown at 20 in Fig. 3. This movement is transmitted through the link 15 to lift the lever 12 to the position shown at 21. It is therefore possible to place one or more tires in position and to securely lock the same by merely returning the arm C and the lever 12 back to the locking and clamping position, as shown by full lines in Fig. 2. Similarly, if it is desired to remove a tire, it can be instantly accomplished by again lifting the levers, said movement of the levers causing the clamping member 12 to be elevated so that the tire may be readily removed.

One of the important features of the present invention is the adjustable mounting of the spring arm 10. This arm is secured to the legs of the Y frame and also to the base plate by means of U bolts 3 and 22. By loosening said bolts it will be obvious that it is possible to adjust the position of the spring arm vertically, thus raising the locking lever 12 and the arm C as these are carried by said arm. This permits the carrier to be adjusted for different sized tires, which is of considerable importance, as different makes of automobiles employ tires of varying sizes. The carrier can therefore be applied to any car, as it may be adjusted to the size tire required.

Another important feature of the present invention is the provision of the spring arm 10. This arm is yielding to a certain extent, and, as it carries the locking arm C and the lever 12, it will be obvious that the tires when placed on the carrier will be rigidly clamped and constantly subjected to the binding force and tension of the spring arm. This feature does not only permit more latitude of adjustment, but it also positively prevents rattling between the supporting arms and the rim of the tire supported thereby.

Another important feature is the simplicity of construction and the ease with which it may be attached to an automobile, the base plate A being so large that a rigid anchorage is provided. The device is therefore not only substantial in construction, but it consists of few parts which render it easy and instantaneous of operation and attractive in appearance.

While a Y frame of specific construction is here shown and U bolts have been employed for securing the spring arm 10, I wish it understood that these features may be varied. Similarly the materials and finish of the several parts may be such as the experience and judgment of the manufacturer may dictate.

Having thus described my invention, what I claim and desire to secure by Letters Patent is:

1. In a tire carrier, a pair of tire engaging elements, a leaf spring element adjustably mounted between said pair of elements, and tire engaging member movably connected to the spring element so as to be tensioned thereby.

2. In a tire carrier, a pair of tire engaging elements, a leaf spring adjustably mounted between said pair of elements and having one end free and unsupported, a third tire engaging element, and means to mount said third tire engaging element so as to resiliently support same from said free end of the spring and to allow the element to swing in a plane at right angles to the plane of the tire.

3. In a tire carrier, a pair of tire engaging elements, a leaf spring element having an end thereof turned outwardly, a third tire engaging element, means to swingingly connect said third tire engaging element to said out turned end of the spring element, and means to adjustably mount the opposite end of said spring element and to rigidly secure same in adjusted position.

4. In a tire carrier, a frame, a pair of tire engaging parts borne by the frame, a vertically slidable spring element between the parts, means to hold said element in adjusted position, a tire engaging member pivoted to the spring element adjacent one end thereof and means between the opposite end of the spring element and said member to hold the latter in operative position under tension.

5. A tire carrier comprising a pair of stationary supporting members, a pivotally mounted clamping and locking lever supported by the carrier and means permitting vertical sliding and fixed adjustment of the pivotal point of said lever.

6. A tire carrier comprising a pair of stationary supporting members, a pivotally mounted clamping and locking lever and a leaf spring support for said lever.

7. A tire carrier comprising a pair of stationary supporting members, a pivotally mounted clamping and locking lever, a spring support for said lever, and means permitting vertical sliding adjustment of the spring support.

8. A tire carrier comprising a frame provided with fixed transverse supporting arms spaced apart and adapted to engage the inner face of a tire, a locking lever pivotally attached to said frame adapted to engage the tire at a point intermediate the supporting arms, means for adjusting the position of said lever vertically by sliding thereof, and means for locking said lever against movement about its pivot when in engagement with a tire.

9. A tire carrier comprising a frame provided with fixed transverse supporting arms spaced apart and adapted to engage the inner face of a tire, a locking lever adapted to engage the tire at a point intermediate the supporting arms, a vertically adjustable spring member secured to the frame, a pivotal connection between the locking lever and the lower end of said spring member and a toggle device attached to the upper end of the spring member and at the lower end to the free end of the locking lever.

10. A tire carrier comprising a frame provided with fixed transverse supporting arms spaced apart and adapted to engage the inner face of a tire, a locking lever, a pivotal mounting for said lever, a leaf spring member, and a toggle device pivotally attached at one end to one end of the spring member and to the locking lever.

11. A tire carrier comprising a frame provided with fixed transverse supporting arms spaced apart and adapted to engage the inner face of a tire, a locking lever, a pivotal mounting for said lever, a leaf spring member, a toggle device pivotally attached to one end of the spring member and to the locking lever and means for locking the toggle device against movement when the locking lever is in engagement with the tire.

12. A tire carrier comprising a Y-shaped frame provided with fixed transverse supporting arms spaced apart and adapted to engage the inner face of a tire, a spring plate secured to the leg portion of the Y frame, means permitting vertical adjustment of said spring plate, a locking lever pivotally mounted on the spring plate and adapted to engage the tire at a point intermediate the supporting arms, a toggle device pivotally attached to the locking lever and the spring and means for locking the toggle device against movement when the locking lever engages the tire.

13. In a tire carrier, a pair of tire engaging elements, a leaf spring element, a third tire engaging element pivoted to one end of said spring element, a member pivoted to the opposite end of said spring element, means between said member and the third tire engaging element to hold the latter in operative position, and means to adjustably mount said spring element.

14. In a tire carrier, a pair of tire engaging elements, a spring element, means to support said spring element between said pair of elements, a tire engaging member pivoted to one end of the spring element, an operating member pivoted to the opposite end of the spring element, and means to connect said operating member and tire engaging member.

In testimony whereof I have hereunto set my hand in the presence of two subscribing witnesses.

THOMAS A. HOOVER.

Witnesses:
 T. W. STOCKTON,
 G. N. BROWN.